United States Patent
Cheng et al.

(10) Patent No.: US 6,570,904 B1
(45) Date of Patent: May 27, 2003

(54) TWO-MIRROR FIGURE "8" RING RESONANTOR

(75) Inventors: Huy-Zu Cheng, Kaohsiung (TW); Sheng-Lung Huang, Kaohsiung (TW); Wood-Hi Cheng, Kaohsiung (TW); Fu-Jen Kao, Kaohsiung (TW); Inn-Chyn Her, Kaohsiung (TW); Pi-Ling Huang, Tainan (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/475,004

(22) Filed: Dec. 30, 1999

(51) Int. Cl.[7] .............................................. H01S 3/081
(52) U.S. Cl. ........................... 372/93; 372/94; 372/31; 372/98
(58) Field of Search ............................. 372/94, 95, 93, 372/21, 10, 84, 45, 64, 22, 92, 98

(56) References Cited

U.S. PATENT DOCUMENTS

| | | | | |
|---|---|---|---|---|
| 3,585,523 A | * | 6/1971 | Glenn | 372/98 |
| 3,805,188 A | * | 4/1974 | Wuerker | 372/19 |
| 4,807,240 A | * | 2/1989 | Goldstone | 372/69 |
| 5,627,849 A | * | 5/1997 | Baer | 372/31 |
| 6,252,892 B1 | * | 6/2001 | Jiang | 372/11 |

* cited by examiner

Primary Examiner—Paul Ip
Assistant Examiner—Tuan Nguyen
(74) Attorney, Agent, or Firm—J.C. Patents

(57) ABSTRACT

The cavity of the invention has a pumping source, a ring cavity, a planar convex lens, an optical gain medium, and/or a nonlinear medium. The laser cavity is formed by two mirrors with the same curvature. The curving surfaces of the two mirrors are coupled by a manner of face to face, whereby a space is defined as the ring cavity. The planar-convex lens is located between the pump beam and the ring cavity to work together with the two mirrors of the ring cavity to focus the pump beam. The pumping light enters the ring cavity at a desired distance of d mm from the mirror axis. The laser light also enters the ring cavity in a propagating direction nearly parallel to the mirror axis. Due to the two curving surfaces of the two mirrors, the light beam is reflected back and forth to form the 3-D figure-"8" light path. The optical gain medium and the nonlinear medium are located between the two mirrors on the light path. The optical gain material is used for generating the laser beam, and the nonlinear medium is used to do secondary harmonic generation so as to convert the laser light to a shorter wavelength.

16 Claims, 8 Drawing Sheets

TWO-MIRROR FIGURE "8" RING RESONANTOR

BACKGROUND OF THE INVENTION

1. Field of Invention

The present invention relates to a laser cavity. More particularly, the present invention relates to a two-mirror 3-dimensional figure-"8" ring resonant cavity with the light path resembles a folded rhombus.

2. Description of Related Art

Diode pumped solid-state lasers have wide applications in optical communications, precision measurement, and optical storage. The diode pumped solid-state lasers usually have advantages of compactness and light weight as semiconductor products, and high quality of output mode as solid-state lasers. Since the longitudinal pumping, or also called as end pumping, has better optical conversion efficiency and better mode matching than those of a transverse pumping for low power lasers. The power density within the resonant cavity is greater than that out of the resonant cavity, most of the end pumping solid-state laser uses the intra-cavity frequency-doubling technology to extend the range of wavelength. However, the intra-cavity frequency-doubling technology is encountering a severe, so called, green problem, causing an instability of light output. As a result, it cannot achieve a high purity of laser light such that the applications are greatly limited.

One method to resolve this problem is arranging the laser to be operated at single longitudinal mode. Such method prevents the frequency beating effects so that the laser light output can be stabilized. There are various technologies to produce the single longitudinal mode laser. For example, optical elements can be additionally implemented in the conventional linear cavity or a ring-type resonant cavity can be used to replace the linear-type resonant cavity. If optical elements are implemented inside the linear-type resonant cavity, the single longitudinal output can be only operated at a very low output power level. One unique capability of the uni-directional ring-type resonator as compared to the linear-type resonator, is that the laser light propagates in a form of traveling wave instead of standing wave. Therefore, the spatial hole burning can be eliminated and the green problem can be resolved by using the ring-type resonator.

FIG. 1 is a drawing, schematically illustrating a conventional ring cavity, which is composed of four lenses. In FIG. 1, two pumping beams 102 enter the cavity. Due to the four lenses 90, 92, 94, and 96, the laser light propagates through several typical optical elements known by one skilled in the art, such as the Nd:YVO4 laser medium 104, astigmatic compensator 106, LBO unit 108, bi-refringent filter 110, and Faraday rotator 112. As a result, a green output 114 propagates out from the lens 96.

Another conventional ring cavity is shown in FIG. 2. FIG. 2 is a drawing, schematically illustrating a conventional triangular resonant cavity composed of two lenses and a gain medium. In FIG. 2, an input coupler (lens) 204 and an output coupler (lens) 206 are coupled together. A pump light beam 202 enters the cavity from the input coupler 204 and leaves from the output coupler 206. The light beam 202 is deflected from the output end of the laser medium 210, so that a triangular light path is formed.

FIG. 3 is a drawing, schematically illustrating a conventional ring cavity using a single crystal. In FIG. 3, a monolithic gain medium is cut to have several surfaces, such as five. The laser light generated by the gain medium is reflected by these surfaces, whereby a closed loop light path is formed.

For the conventional ring-type resonant cavities described above, the light path can be formed like co-planar 8-like path. However, the ring-type cavity usually needs more optical elements than a linear resonant cavity. The dimension is larger, and the design is more difficult. For the structure with a single crystal, though the dimension can be reduced, it is still difficult to have the reflection surfaces been precisely cut. Moreover, it still has residual spatial hole burning effect on the input/output surface.

SUMMARY OF THE INVENTION

It is an object of this invention to provide a two-mirror 3-dimentional (3-D) figure "8" ring-type resonant cavity, which uses two mirrors to form 3-D figure-"8" light path, so as to achieve a single longitudinal mode output with small dimension and less optical elements.

The cavity of the invention includes a laser source, a ring cavity, a focusing lens, an optical gain medium, and a nonlinear medium, such as a frequency doubler. The laser cavity is formed by two mirrors preferably with the same curvature. In general, the curvatures of the two spherical mirrors can be different. The curving surfaces of the two mirrors are coupled by a manner of face to face, whereby a space is defined as the ring cavity. The planar convex lens is located between the pumping source and the ring cavity to works as a pair with the input coupler of the ring cavity to focus pumping light. The pumping light enters gain medium where is located at a desired distance of d mm away from the cavity axis. Due to the two curving surfaces of the two mirrors, the light beam is reflected back and forth to form the 3-D figure-"8" light path as shown in FIG. 5. The optical gain medium and the nonlinear medium are located on the two arms of this 3-D figure-"8" of the light path. The optical gain material is used for generating laser light, and the nonlinear medium is used to do second harmonic generation so as to convert the fundamental laser light to a shorter wavelength.

The pumping light can be generated by a semiconductor diode, but can also be generated by other types of laser. The gain medium can include a three-level type, four-level type, or even an upconversion type. The gain medium can also be glued with the nonlinear medium to form a single unit. According to the desired function, the nonlinear medium can, for example, include a frequency doubler. Alternatively, a saturated absorbing device for a Q-switch laser or a mode-locked laser can also be used. The frequency doubler can also work together with the saturated absorbing device.

The cavity of the invention not only includes the advantages of linear cavity with a small dimension and only few of optical elements, but also includes the advantages of ring-type cavity with stable single longitudinal mode output and flexibility for Q-switching, second harmonic generation or tuning of the single-frequency output.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrated embodiments of the invention and, together with the description, serve to explain the principles of the invention. In the drawings.

DESCRIPTION OF THE PREFERRED EMBODIMENTS

Figure 1:
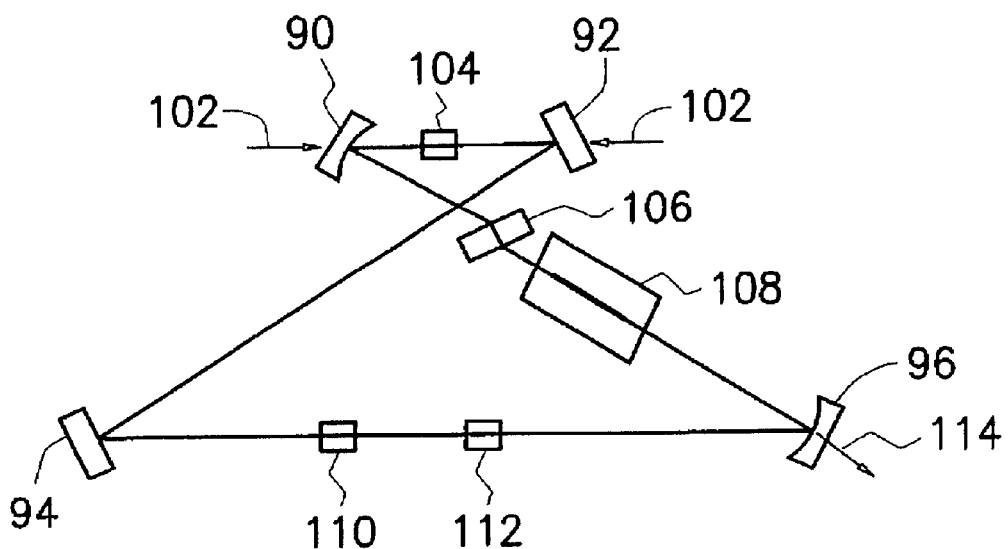
FIG. 1 is a drawing, schematically illustrating a conventional ring cavity, which is composed of four lenses.
Figure 2:
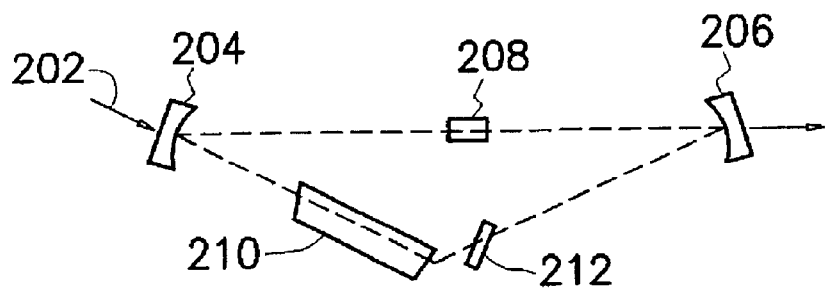
FIG. 2 is a drawing, schematically illustrating a conventional ring cavity composed of two lenses and a gain medium cut at Brewster angle.
Figure 3:
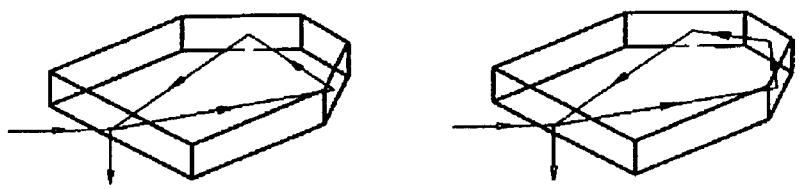
FIG. 3 is a drawing, schematically illustrating a conventional ring cavity using a single crystal.
Figure 4:
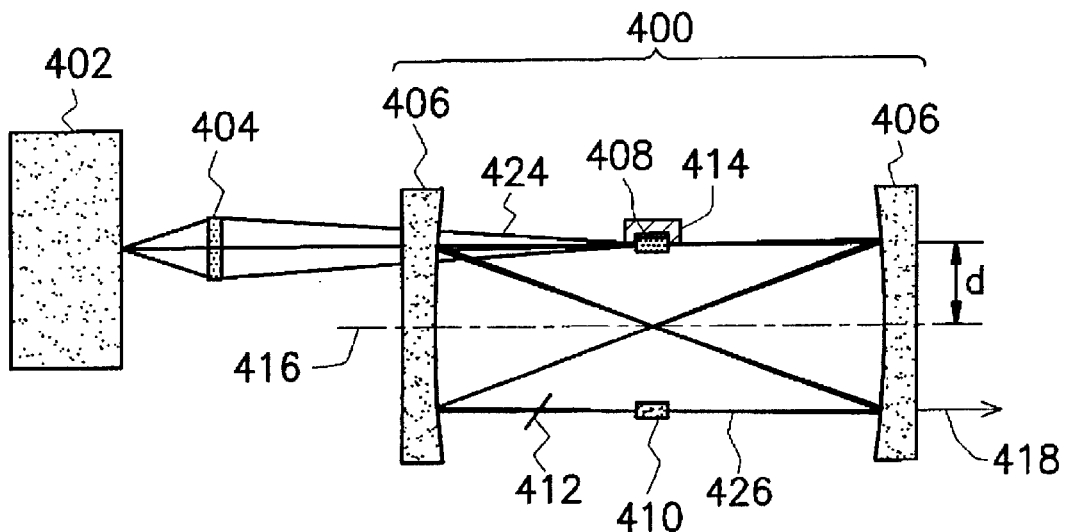
FIG. 4 is a drawing, schematically illustrating a two-mirror 3-dimentional figure-"8" ring-type resonant cavity, according to a preferred embodiment of the invention.

FIG. 4 is a drawing, schematically illustrating a two-mirror 3-dimentional figure-"8" ring-type resonant cavity, according to the preferred embodiment of the invention. In FIG. 4, a two-mirror cavity 400 includes two mirrors 406, such as planar concave lenses, face to face to define a space serving as the resonant cavity. Another planar convex lens 404 is located on one side of the two-mirror lens unit to work together to shape the pump beam. Laser light generated by, for example, a semiconductor laser 402 enters the two-mirror cavity 400 through the planar convex lens 404, and is properly focused also to serve as a pump beam. The pump beam enters the mirror 406 at a distance of d mm from the mirror axis 416, and the propagating direction is parallel to the mirror axis 416.

After the pump beam enters the two-mirror cavity 400 to pump the gain medium 408, a laser light is generated. Due to the curving surfaces of the planar concave lenses 406, which preferably have the same curvature for the curving surfaces in the preferred embodiment, a figure-"8" light path is built up. For the general design, the two curvatures are not necessary to be the same. The light path is composed of four arms that do not intersect at the cavity center. An optical nonlinear medium 410 is also included in the two-mirror cavity 400 so as to modulate the laser light to higher frequency. The optical nonlinear medium 410, for example, can be a frequency doubler, which can do secondary harmonic generation to reduce the wavelength.

Figure 5A:
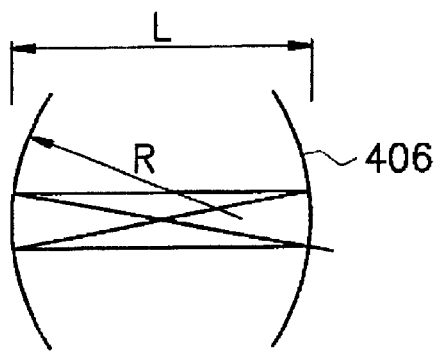
FIGS. 5A–5C are top, side, and end views of the two-mirror cavity, schematically illustrating the light path in the two-mirror cavity, according to the preferred embodiment of the invention.
Figure 5B:
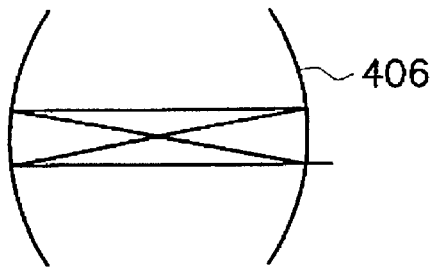
Figure 5C:
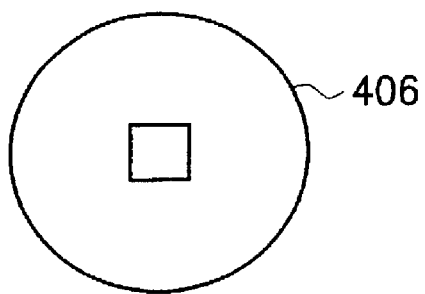

Moreover, in order to obtain the laser light travelling uni-directionally, a magnet 414 can be applied on the optical gain medium 408. A Brewster plate 412 may also be optionally included. The magnet 414 is used to produce a magnetic field, to provide Faraday rotation on the light polarization. The Brewster plate 412 as a reciprocal rotator theoretically suppresses the laser beam travelling in the backward direction. The suppression effect also depends on the polarization angle. For example, about 2° of polarization rotation is estimated for both reciprocal and non-reciprocal rotators. This creates about 0.5% difference in round-trip loss for a counter propagating beam. As a result, only one propagation direction is survived. FIGS. 5A–5C are top, side, and end views of the two-mirror cavity, schematically illustrating a desired light path in the two-mirror cavity, according to the preferred embodiment of the invention. In FIGS. 5A–5C, the light path is a 3-dimentional (3-D) geometrical structure.

Since the structure of the light path depends on the parameter L, which is the distance between the two planar concave lenses 406, and the curvature radius R of the concave curving surface. There are three situations are investigated.

Figure 6A:
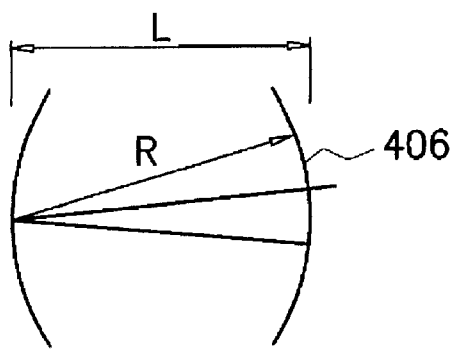
FIGS. 6A–6C are top, side, and end views of the two-mirror cavity, schematically illustrating a light path in the two-mirror cavity used for L=R, according to the preferred embodiment of the invention.
Figure 6B:
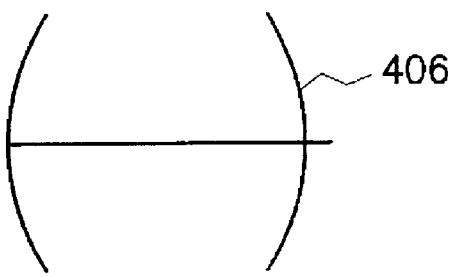
Figure 6C:
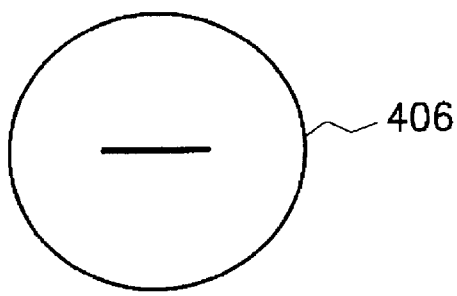
Figure 7:
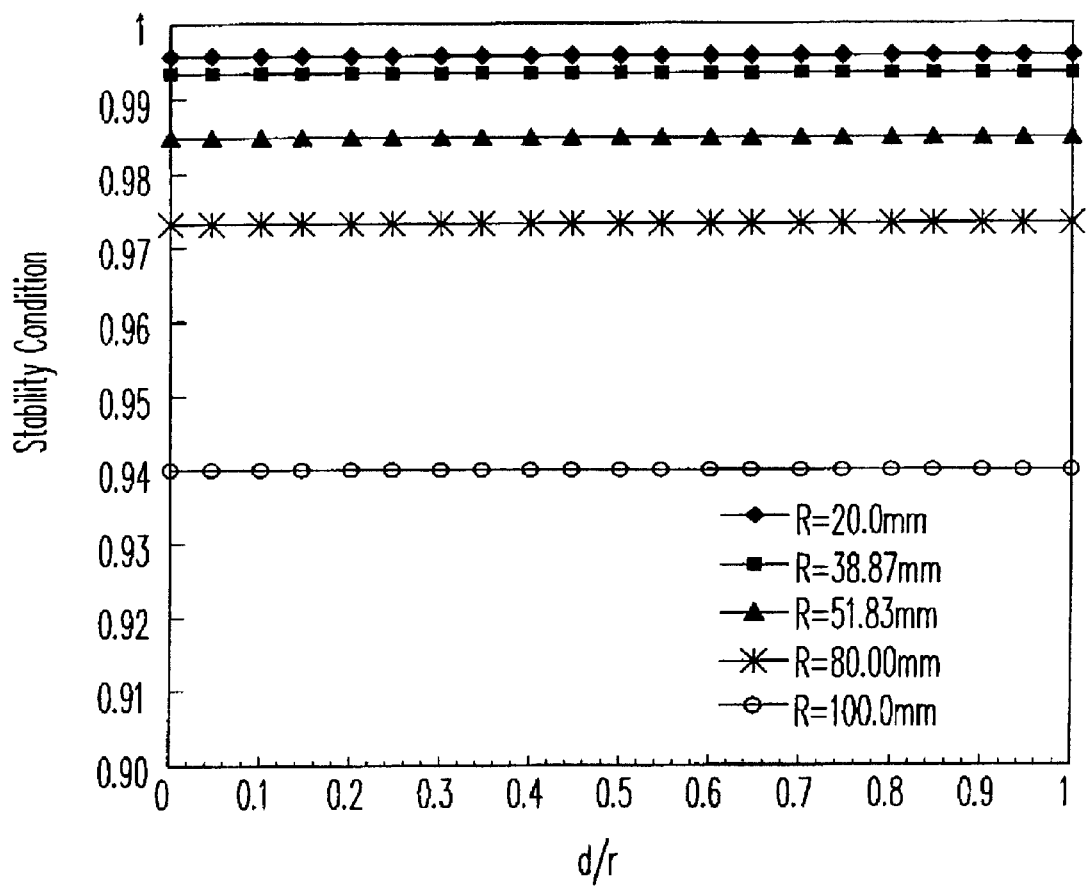
FIG. 7 is a plot of stability versus a ratio of d/R, schematically illustrating a stability investigation for the two-mirror cavity at various operation conditions, according to the preferred embodiment of the invention.

For the condition of L=R, the light path is a triangular structure, not a 3-D structure. FIGS. 6A–6C are top, side, and end views of the two-mirror cavity, schematically illustrating a light path in the two-mirror cavity used for L=R, according to the preferred embodiment of the invention. Since L=R, the laser light is only reflected by the curving surfaces without producing a folded rhombus like geometric structure. According to experimental results, it is noted that although the distance d in FIG. 4 and the curvature of the input coupler are changed, the light path still remain in triangular shape. Further, the light stability may increase as the curvature radius R increases as shown in FIG. 7 but it is independent from the distance of d. FIG. 7 is a plot of stability versus a ratio of d/R, illustrating a stability investigation for the two-mirror cavity at L=R for various curvatures of input coupler.

Figure 8A:
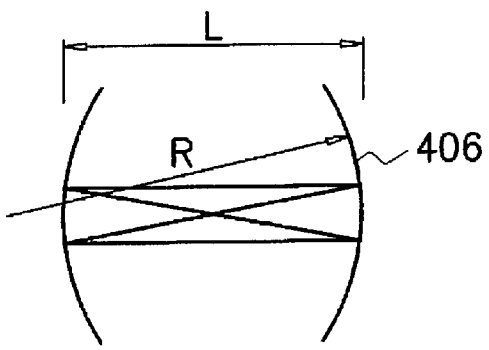
FIGS. 8A–8C are top, side, and end views of the two-mirror cavity, schematically illustrating another light path in the two-mirror cavity used for L<R, according to the preferred embodiment of the invention.
Figure 8B:
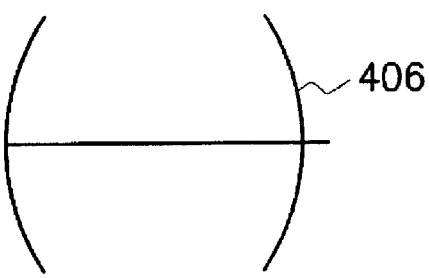
Figure 8C:
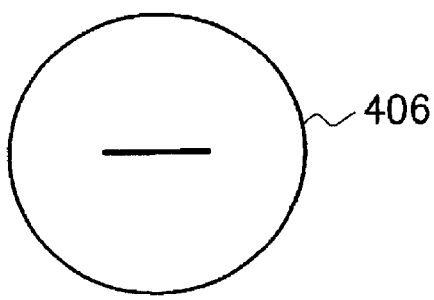

As the curvature radius R is greater than the distance L between the two lenses 406 (L<R), the light path is shown in FIGS. 8A–8C, which are top, side, and end views of the two-mirror cavity, schematically illustrating another light path in the two-mirror cavity used for L<R, according to the preferred embodiment of the invention. In FIGS. 8A–8C, as the laser light satisfies the condition of L<R, and L satisfies a relation $$L = 2 \times \left\{ \frac{d}{\tan\left[2 \times \sin^{-1}\left(\frac{d}{R}\right)\right]} + R - \sqrt{R^2 - d^2} \right\}.$$

Figure 9:
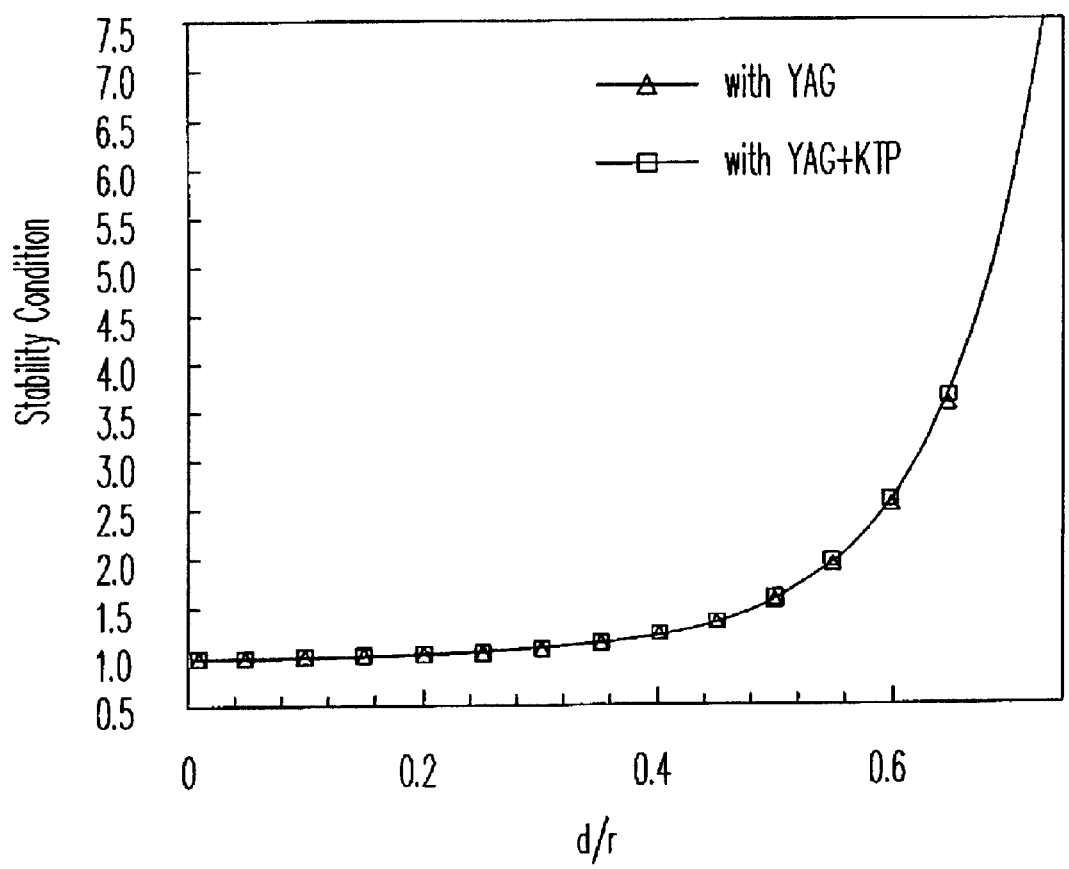
FIG. 9 is a plot of stability versus a ratio of d/R, illustrating a stability investigation for the two-mirror cavity at various curvature quantities for beam path of at a planar figure-"8" conditions in FIGS. 8A–8C, according to the preferred embodiment of the invention.

In these conditions, a planar figure-"8" light path is formed. For this light path, it is quite unstable. The stability analyses are performed and results are shown in FIG. 9. FIG. 9 is a plot of stability versus a ratio of d/R, illustrating a stability investigation for the two-mirror cavity at various curvature quantities at a planar figure-"8" conditions in FIGS. 8A–8C. In these conditions, no mater how the curvature radius R or the distance d are varied, the stability coefficient is always greater than 1, which indicates the laser light always lies in the unstable region.

Figure 10:
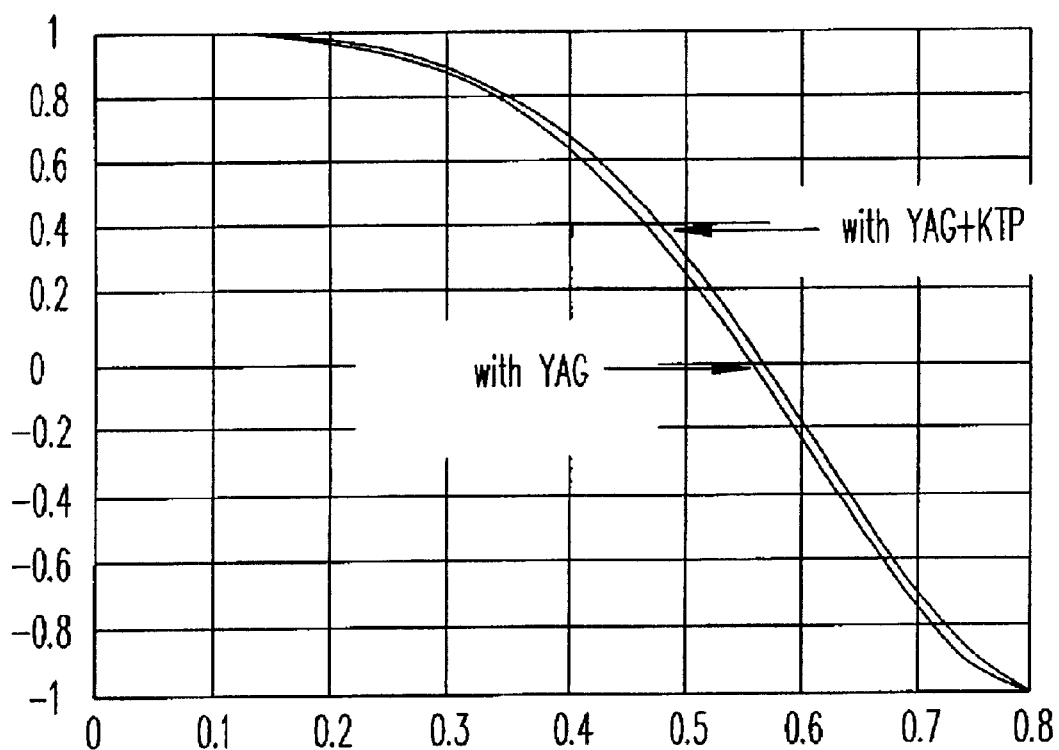
FIG. 10 is a plot of stability versus a ratio of d/R, illustrating a stability investigation for the two-mirror cavity at various curvature quantities for beam path of 3-dimentional figure-"8" condition in FIGS. 5A–5C, according to the preferred embodiment of the invention.

As the curvature radius R is less than the distance L between the two lenses 406 (L>R), and preferably L=2R−$\sqrt{R^2-d^2}$, the light path is shown in FIGS. 5A–5C, which has 3-D figure-"8" light path. In these operation conditions, the stability is investigated by an approximation method as shown in FIG. 10. FIG. 10 is a plot of stability versus a ratio of d/R, illustrating a stability investigation for the two-mirror cavity at various curvature quantities at 3-dimentional figure-"8" condition in FIGS. 5A–5C, according to the preferred embodiment of the invention. It is clear that the stability condition is less than one. The stability is better as the ratio of d/R is larger, where the distance d is the location where the optical gain medium is located from the mirror axis 416. In other words, it has better stability if the curvature radius R is smaller. This also allows the dimension to be greatly reduced.

Figure 11:
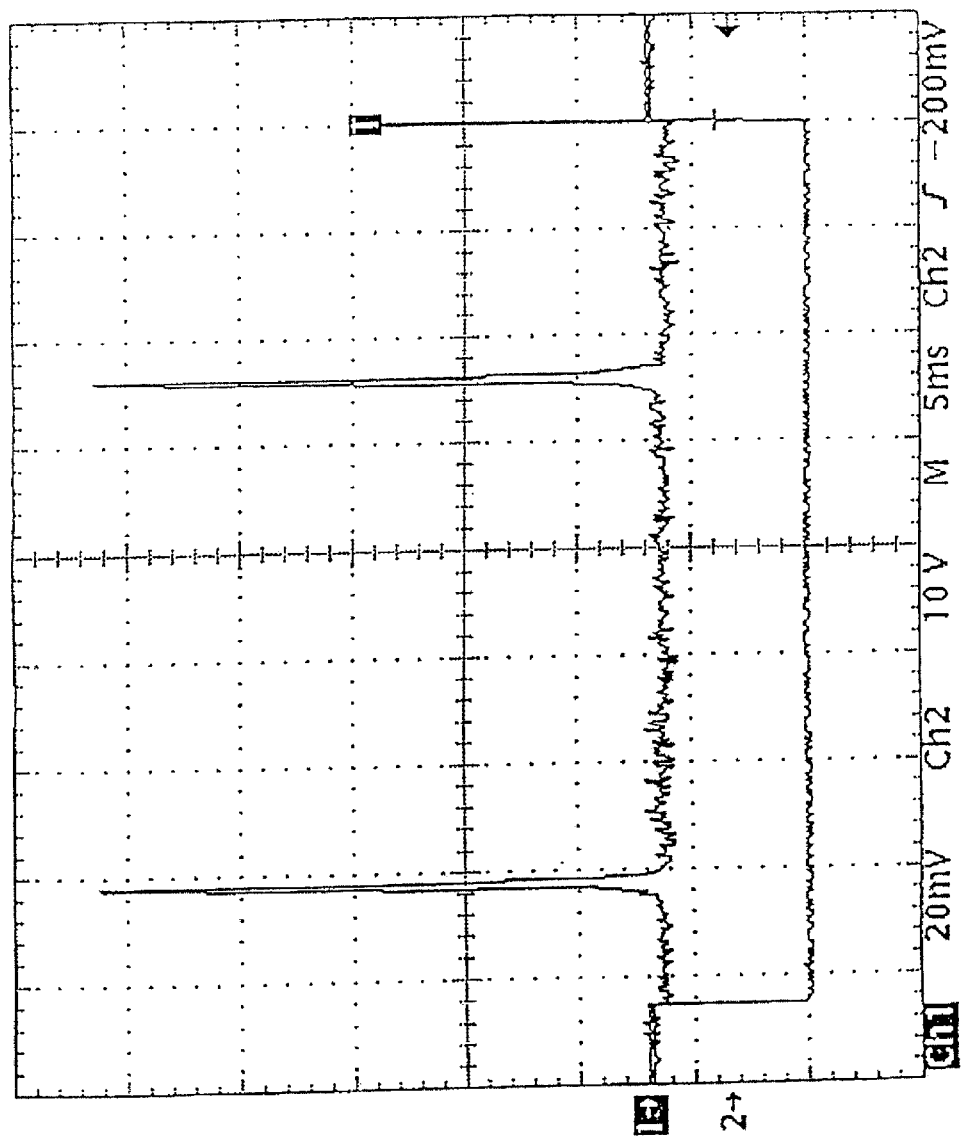
FIG. 11 is the single longitudinal operation of the preferred embodiment of the invention.
Figure 12:
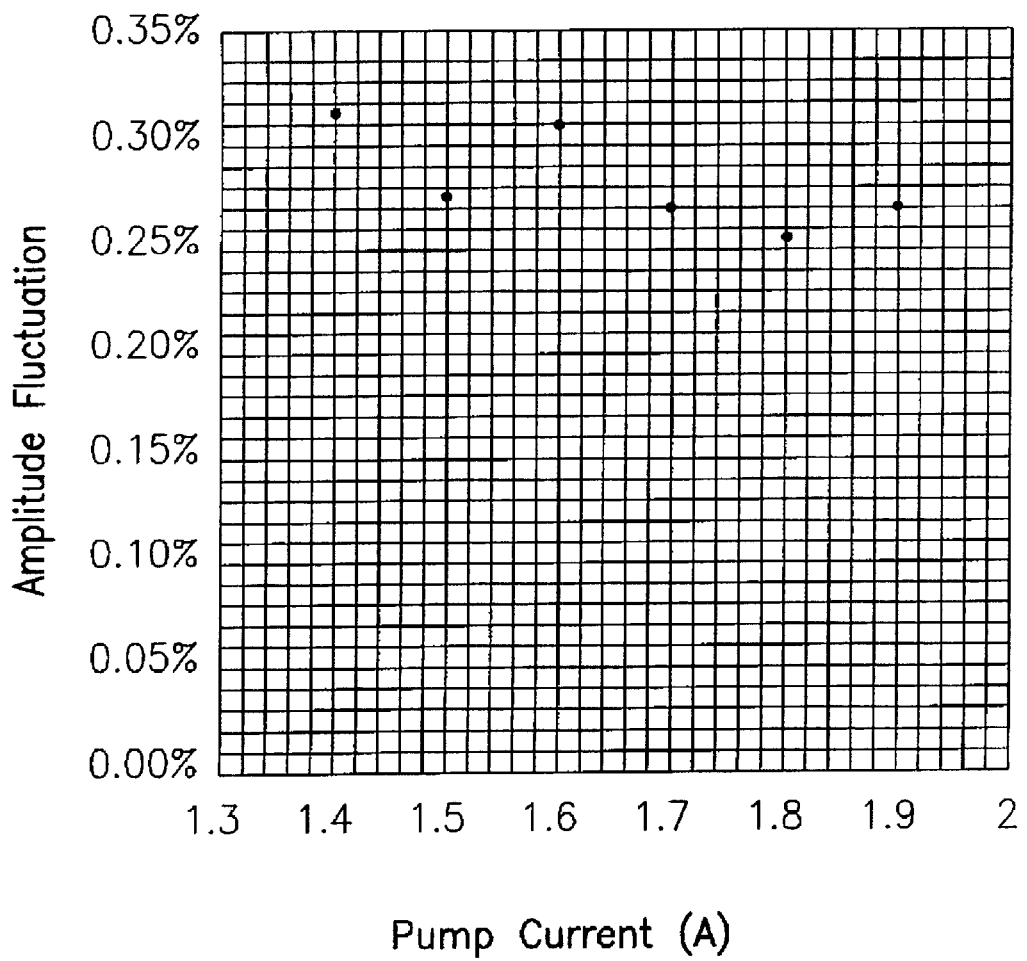
FIG. 12 is a data plot, illustrating the amplitude fluctuation at various pumping current.

FIG. 11 is the spectra of light output on the longitudinal mode, according to the preferred embodiment of the invention. In FIG. 11, the output signal has a greatly narrow bandwidth, it achieves the single longitudinal mode for the light output. The result of FIG. 11 are measured by a Fabry-Perot spectrometer, which has a free spectral range of about 7.5 GHz. FIG. 12 is a data plot, schematically illustrating the amplitude fluctuation versus the pumping current. As shown in FIG. 12, the amplitude fluctuation for the CW output is less than 0.3%.

The two-mirror 3-D figure-"8" ring-type resonant cavity of the invention at the operation conditions of L>R has stable light output with a single longitudinal mode. This is very helpful for precision measurement. The apparatus dimension is effectively reduced, and the design is simplified.

In the above descriptions, the pump beam can be typically generated by semiconductor diode, but can also be generated by other types of laser. The gain medium can also be glued with the nonlinear medium to form a single unit of crystal. According to the desired function, the nonlinear medium can, for example, include the frequency doubler. Alteratively, a saturated absorbing device 410 serving for a Q-switch laser or a mode-locked laser can be used. The frequency doubler can also work together with the saturated absorbing device.

The cavity of the invention not only includes the advantages of linear cavity with a small dimension and only few of optical elements, but also includes the advantages of ring-type cavity with stable single frequency output.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure of a two-mirror 3-dimensional figure-"8" ring-type resonant cavity, the structure comprising:
    a pumping source emitting a pump light;
    a 3-dimensional (3-D) ring-type resonant cavity including two planar concave mirrors arranged by face-to-face for the curving surfaces of the two planar concave mirrors, wherein the two planar concave mirrors are aligned on a cavity axis and is separated by a distance of L; and
    a planar convex lens located between the pumping source and the 3-dimensional ring-type resonant cavity, so as to work together for focusing the pump light,
    wherein a 3-D figure-"8" laser path is built in the 3-D ring-type resonant cavity between the two planar concave mirrors when the pump light enters the 3-D ring-type resonant cavity at a location by a distance of d from the cavity axis by a propagating direction parallel to the cavity axis, whereby a laser light is generated.

2. The structure of claim 1, wherein the 3-D figure-"8" ring-type resonant cavity further comprises
    an optical gain medium located on the 3-D figure-"8" laser path, used to generate the laser light.

3. The structure of claim 2, wherein the 3-D ring-type resonant cavity further comprises:
    a magnetic device located around the optical gain medium producing a magnetic field along a forward direction of the 3-D laser path to provide a Faraday rotation upon the polarization of the laser light; and
    a non-reciprocal rotator on the 3-D laser path, so as to obtain a uni-direction of the laser light on the propagation direction.

4. The structure of claim 3, wherein the non-reciprocal rotator comprises a Brewster plate.

5. The structure of claim 2, wherein the optical gain medium comprises a three-level type of the optical gain medium.

6. The structure of claim 2, wherein the optical gain medium comprises a four-level type of the optical gain medium.

7. The structure of claim 2, wherein the optical gain medium comprises an up-conversion type of the optical gain medium.

8. The structure of claim 2, wherein the optical gain medium and the nonlinear medium are glued together.

9. The structure of claim 2, wherein the nonlinear medium comprises a frequency multiplier crystal.

10. The structure of claim 1, wherein the structure comprises a saturated absorbing device incorporates with the laser source, which comprises one selected from a group consisting of a Q-switch laser and a mode-locked laser.

11. The structure of claim 1, wherein the 3-D laser path built in the 3-D ring-type resonant cavity is a folded rhombus geometric structure.

12. The structure of claim 1, wherein the curving surfaces of the two planar concave lenses in the 3-D ring-type resonant cavity have the same curvature radius of R.

13. The structure of claim 12, wherein the 3-D ring-type resonant cavity is operated at conditions of L>R and L=2R−$\sqrt{R^2-d^2}$, where as previously defined L is the distance between the two planar concave lenses, R is the curvature radius of the curving surfaces of the two planar concave lenses, and d is the entering location onto the 3-D ring-type resonant cavity.

14. The structure of claim 1, wherein the structure comprises an optional nonlinear medium located on the 3-D figure-"8" laser path, used to convert the fundamental frequency of the laser light into a higher frequency.

15. A structure of a two-mirror 3-dimensional ring-type resonant cavity, the structure comprising:
    a pumping source emitting a pump light;
    a 3-dimensional (3-D) ring-type resonant cavity including two planar concave mirrors arranged by face-to-face for the curving surfaces of the two planar concave mirrors, wherein the two planar concave mirrors are aligned on a cavity axis and is separated by a distance of L; and
    a planar convex lens located between the pumping source and the 3-dimensional ring-type resonant cavity, so as to work together for focusing the pump light, wherein a 3-D laser path is built in the 3-D ring-type resonant cavity between the two planar concave mirrors when the pump light enters the 3-D ring-type resonant cavity at a location by a distance of d from the cavity axis by a propagating direction parallel to the cavity axis, whereby a laser light is generated.

16. The structure of claim 15, wherein the curving surfaces of the two planar concave mirrors in the 3-D ring-type resonant cavity have the same curvature radius of R, and the 3-D ring-type resonant cavity is operated at conditions of $L>R$ and $L=2R-\sqrt{R^2-d^2}$, where as previously defined L is the distance between the two planar concave mirrors and d is the entering location onto the 3-D ring-type resonant cavity.

* * * * *